UNITED STATES PATENT OFFICE.

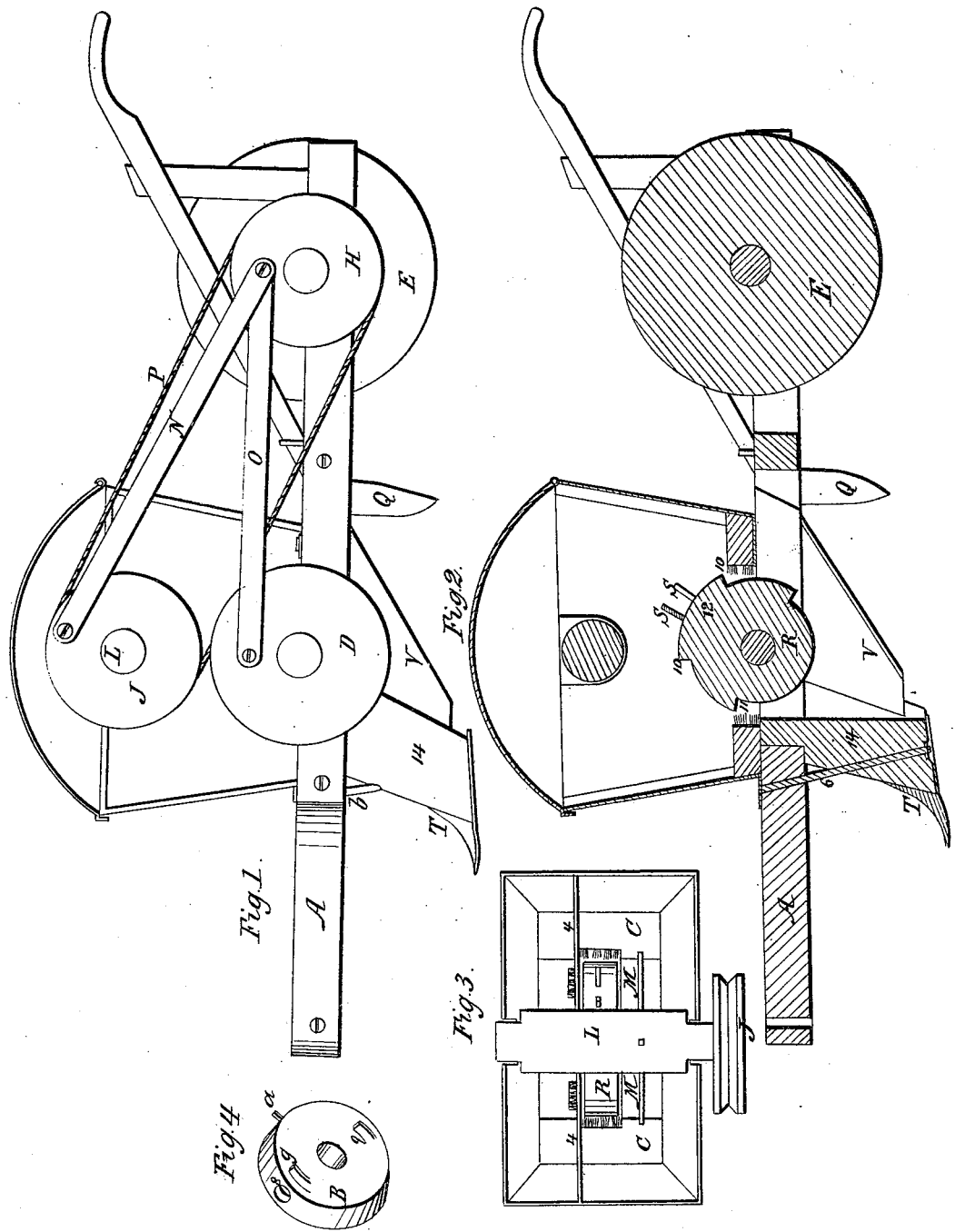

WILLIS G. MURPHY, OF SEGUIN, TEXAS.

IMPROVEMENT IN SEED-PLANTERS.

Specification forming part of Letters Patent No. 25,134, dated August 16, 1859.

*To all whom it may concern:*

Be it known that I, WILLIS G. MURPHY, of the town of Seguin, in the county of Guadalupe and State of Texas, have invented a new and Improved Seed-Dropper; and I do hereby declare that the following is a full and exact description thereof, reference being had to the accompanying drawings, and to the letters and figures marked thereon, of which—

Figure 1 is a vertical longitudinal side view of the machine. Fig. 2 is a sectional vertical longitudinal view taken through the center of Fig. 1. Fig. 3 is a top view of the hopper, and Fig. 4 a perspective view of seeding-wheel B.

The nature of my invention consists in certain devices for dropping corn and cotton-seed at the same time, or in dropping one kind of seed alone, as hereinafter described.

A in the drawings is the beam of wood, about three inches thick and about twelve inches wide, with mortises in the forward end, into which I insert the tenons of the plow, and with bolts through the beam (one before and one behind the feed-wheel) for strength.

B in the drawings is the vibratory vertical feed-wheel, to be used for dropping corn and pumpkin and melon seed, which wheel is, say, six inches in diameter and from one inch to one and one-eighth inch in thickness. This is to be governed by the largeness and quantity of the seed to be dropped. For fine seed a much thinner wheel is required than for dropping large seed, such as corn and cotton. This wheel, as represented, contains two holes, 8, on its face, their size and depth to be regulated by the quality and quantity of seed to be dropped and the distance apart required. On the side of the wheel B are two notches, (marked 9,) each half an inch wide and at the upper side three-eighths of an inch deep, gradually running out to the surface on the side of the wheel, parallel with the edge of the wheel, and about one inch long. These two notches are opposite each other, about one-half an inch above either hole in the face of the wheel used for planting pumpkin, bean, and melon seed with corn. They may vary in size to suit the seed to be dropped. One is enough for ordinary purposes. On its face, on the top, half-way between the holes, is inserted a perpendicular pin, *a*, about one-half an inch in length, for stirring the seed.

R is a vibrating vertical feed-wheel for cotton-seed, which is substituted for and is in size similar to wheel B. It has four teeth, each one-half an inch deep and cut verging to the center. The teeth 10 are long enough to vibrate to and fro to the beam, teeth 11 to vibrate above the beam, and brushes in the hopper for filling in the seed. On the top of this wheel, on its face, are inserted two pins from three-fourths to one inch in length and one inch apart. These are the stirrers marked S.

J is a drawing five inches in diameter and three-fourths of an inch thick, with a groove on the face for a string band, through which a shaft, L, passes, and on which is attached one end of the pitman marked N. On this wheel runs the band marked P. The shaft of this wheel runs across the middle of the box or hopper. Through this shaft pass two stirrers marked M.

D is a crank-wheel six inches in diameter, three-fourths of an inch thick, and is attached to the end of the shaft passing through the feed-wheels B R, and to this wheel is attached the pitman marked O.

H is a wheel five inches in diameter, three-fourths of an inch thick, to which is attached on one pin the two pitmen O and N. There is a groove on the face of the wheel, in which runs the band P. This wheel is fastened at its center to a shaft which passes through a driving-wheel, E, and is sunk one-half its thickness into the beam on which it revolves.

E is a wheel about fourteen inches in diameter and seven inches thick, through which is fixed at the center of the shaft described in wheel H.

C is a wooden hopper in two apartments for planting different seed at the same time; 4, the partition. This partition is of sheet-iron. In the bottom (see Figs. 2 and 3) are fastened small stiff brushes to act on the face of the seed-dropping wheel for planting all seed except cotton, when they may be dispensed with. A brush is used on the side of the corn-planting wheel, also, to cut off the seed.

T is the plow, attached to the fore part of the beam, the helve extending back to the center, or a little past the feed-wheels. 14 represents that portion of the plow which is constructed of strong durable wood, to be six or seven inches wide and five and a half inches thick on the back, where it comes against the beam, and four inches thick on the back at the bottom, and about five and a half inches wide at the point. This wood portion is slightly convex from the back edges to the front, on the bottom of which is fastened by a bolt the foot or shoe pointed with steel, as represented in Figs. 1 and 2.

V is a tin or sheet-iron conductor placed in the groove in the back of the helve, and is attached to the beam, the helve forming a part of the conductor.

The wheel E drives the machinery and rolls the ground over the seed.

Q are the coverers.

This machine operates well, is cheaply constructed, and is not liable to get out of repair.

Having described my machine, what I claim, and desire to secure by Letters Patent, is—

The arrangement of the beam A, hopper C, wheels D, J, H, and E, seeding-wheels R and B, helve 14, plow T, coverers Q, and conductor V, as described, and for the purposes set forth.

WILLIS G. MURPHY.

Witnesses:
G. H. SHERWOOD,
E. J. STANLEY.